United States Patent Office 3,300,318
Patented Jan. 24, 1967

---

3,300,318
LOW CALORIE CREAM-TYPE SALAD DRESSING
Alina S. Szczesniak, Yonkers, N.Y., and Eric Engel, Winnetka, Ill., assignors to General Foods Corporation, White Plains, N.Y., a corporation of Delaware
No Drawing. Filed July 23, 1963, Ser. No. 296,937
2 Claims. (Cl. 99—144)

This invention relates to a low calorie cream-type salad dressing containing a very low level of edible oil.

The usual cream-type salad dressings are emulsions of edible oil, egg material, acidifying agents, sweetening agents, salt, flavoring ingredients and water, wherein the edible oil content may be as high as 70–80% and the water content as low as 5–10% by weight of the product. The acidifying agents usually include vinegar, lemon juice and the like, while the flavoring agents include mustard, spices and the like.

The usual cream-type salad dressings, due to their high oil content, are expensive and have a high calorie value which limits their use by people with calorie-restricted diets. It appears that the high oil content and the low water content are necessary to form a relatively stable emulsion between the edible oil, egg yolk and water. Efforts to produce a salad dressing of lower caloric value by reducing the oil content and increasing the water content have met with difficulty due to the tendency of such salad dressing to separate on standing. This has been remedied in part by the incorporation of starch in combination with edible gums in whole or in part for the edible oil. However, while this has improved the stability of the product, it has also resulted in an undesirable texture and flavor in a cream-type salad dressing.

It would be desirable if an economical and stable low calorie cream-type salad dressing could be produced which has the flavor and texture of a normal cream-type salad dressing while at the same time having a considerably lower level of edible oil than that normally used in the manufacture of salad dressings.

It has now been discovered that a stable low calorie cream-type salad dressing having water as the major component and containing edible vegetable oil, egg yolk, an acidifying agent, a sweetening agent, salt and flavoring ingredients may be prepared by incorporating 3–10% by weight of gelatinized starch containing less than 25% amylose, 0.1–2% propylene glycol alginate and 0.1–2% glycerol in said dressing.

In preparation of the salad dressing of this invention, it has been found desirable to blend the following ingredients in the indicated amounts:

| Ingredients | Permissible Range, Percent By Weight | Preferred Range, Percent By Weight |
|---|---|---|
| Water | 50–70 | 60.0 |
| Acidifying ingredient | 8–20 | 10.0 |
| Edible Vegetable Oil | 5–12 | 8.0 |
| Sweetening Agent | 5–12 | 7.0 |
| Starch | 3–10 | 6.0 |
| Egg Ingredient | 3–10 | 6.0 |
| Salt | 0.5–3 | 1.5 |
| Propylene Glycol Alginate | 0.1–2 | 0.3 |
| Glycerol | 0.1–2 | 0.2 |
| Flavoring Ingredients | 0.1–1 | 1.0 |

In the above general recipe, the acidifying substance may be any type of vinegar, such as wine vinegar or distilled cider, lemon juice or other acidic substances, wherein the level of acetic acid or citric acid is about 5–15%, usually about 10%. The acidifying substances serve to modify the textural properties of the starch in the direction of increased shortness while giving the acid or vinegar-like flavor associated with this type product.

The vegetable oil may be corn oil, olive oil, cottonseed oil, soybean oil and the like. The egg material may be any egg ingredient which contains egg yolk or egg lecithin and may include fresh egg yolk, frozen or dried egg yolk, fresh whole eggs and frozen or dried whole eggs. The presence of edible oil is essential in order to give the final product a desirable texture and flavor which approaches that of a normal cream-type salad dressing. The oil takes part in the emulsion formation, acts as a lubricant and contributes to the smooth "oily" mouthfeel. Egg lecithin or egg yolk is necessary to provide the edible emulsifying agent which is required when using an edible oil. The egg material reacts with the non-gel forming gum, i.e., propylene glycol alginate, to form a stable gel. The egg also serves to stabilize the emulsion, contributes to color, flavor and smooth mouthfeel of the dressing. However, these ingredients should be present at a very low level, as specified, in order to keep the caloric value in a range of 10–30% of that normally present in a cream-type dressing.

In order to produce the desired body or consistency required in a salad dressing of the cream-type, it is necessary to use a combination of low amylose starch, glycerol and a non-gel forming propylene glycol alginate which will react with the egg ingredient present to thereby give desirable properties to the dressing.

It is a particular feature of this invention to use a specific type of starch in order to avoid the stability and texture problems inherent in low calorie salad dressings employing low levels of edible oil. The starch composition for use in this invention should be a bland tasting starch which contributes the mayonnaise or cream-like mouthfeel properties necessary while at the same time having sufficient water absorption properties to avoid syneresis on standing and provide a longer shelf-life for the product. Among the starches which may be used are waxy maize starch in modified or unmodified form, blends of waxy maize starch and other starches, corn starch, and tapioca starch. All of these starches must have less than 25% amylose, preferably being totally absent of any amylose content.

Propylene glycol alginate is normally a soft gum, i.e., a gum which is not a gel-former in the hydrated form. Unlike gel-forming gums such as agar-agar, pectin, alginates, carrageenates and gelatin, this gum is insensitive to heavy metal ions and changes in pH or temperature. However, in the presence of egg material, the gum gives a unique reaction which imparts a desirable stiffness and shortness to the salad dressing without impairing its spreadability. Moreover, the gum in combination with the particular type of starch used in this invention helps to prevent syneresis on storage.

Glycerol is an essential ingredient and contributes to the shiny appearance of the product while giving a desirable short, smooth mouthfeel which is characteristic of the normal salad dressing incorporating the high level edible oil and egg yolk. The glycerol together with the propylene glycol alginate allow a much greater ratio of starch paste to be used with the egg yolk-oil emulsion while still maintaining the mouthfeel, spreadability and appearance of a normal cream-type salad dressing.

The sweetening agent for use in this invention may be a non-caloric sweetener or a caloric sweetener. The non-caloric sweetener may include cyclamate and/or saccharin. Mixtures of cyclamate and sorbitol can be used and mixtures of cyclamate and saccharin can be substituted for the cyclamate. However, at the low levels employed it may be desirable to use a high calorie sweetening agent, such as sugar, in order to impart the desirable taste characteristics to the dressing.

The flavoring ingredients may include dry mustard, spices and the like. It is desirable to use dry mustard since mustard is a good stabilizer for the oil-egg yolk emulsion.

Generally, the cream-type salad dressing of this invention may be made by making a starch paste and egg yolk-oil emulsion and then blending the paste and emulsion together. The starch paste is prepared by first mixing the starch, glycerol, sweetening agent, salt, and propylene glycol alginate to achieve a well blended mixture. This mixture is then slowly added and blended into a mixture of water and the acidifying substances, e.g., vinegar and lemon juice. This mixture is then cooked while stirring and agitation is continued for about 10 minutes until the gelatinization pont of the starch ingredient is exceeded. This is necessary for achieving a good mouthfeel and good stability in the product. Strong agitation and only a minimum amount of heat should be applied after gelatinization to prevent scorching. About 12–13% of the water content is lost during cooking. The gelatinized starch paste is then cooled to room temperature and aged or tempered for at least 3 hours, preferably 6–12 hours in order to develop the optimum texture. The egg yolk-oil emulsion is prepared by mixing the egg yolks with the flavoring ingredients, e.g., mustard and spices, in an electric mixer at low speed to achieve a smooth paste. The speed of the electric mixer is then increased to maximum and the cold oil is slowly added while vigorously agitating the mixture. The starch paste is added slowly to the egg yolk-oil emulsion and then gently agitated at low speed in an electric mixer until a smooth, homogeneous emulsion is obtained. The speed of mixing in this final stage should preferably be gentle in order to avoid too much shear, excessive shear causing a decrease in the final viscosity of the dressing.

This invention will now be described by reference to the following specific example.

*Example*

| Ingredients | Grams | Percent |
| --- | --- | --- |
| Starch Paste: | | |
| Waxy Maize Starch | 55.0 | 6.2 |
| Sugar | 53.0 | 6.0 |
| Salt | 23.5 | 2.7 |
| Propylene Glycol Alginate | 3.2 | 0.4 |
| Vinegar, White Wine | 80.0 | 9.1 |
| Vinegar, Cider | 11.0 | 1.3 |
| Vinegar, White | 7.0 | 0.8 |
| Lemon Juice | 34.0 | 3.8 |
| Glycerol | 2.2 | 0.3 |
| Water | 471.3 | 53.2 |
| Egg Yolk-Oil Emulsion: | | |
| Egg Yolk | 56.5 | 6.4 |
| Dry Mustard | 3.0 | 0.3 |
| Corn Oil | 83.5 | 9.5 |
| Total | 883.3 | 100.0 |

The starch paste was prepared by first blending the solid paste ingredients with propylene glycol alginate and glycerol in a Hobart mixer. The mixture was then added to a solution of water, vinegar and lemon juice and blended to achieve a homogeneous mix. The mixture was then cooked with agitation for about 10 minutes to raise the product temperature of the waxy maize starch to 170–185° F. The temperature was then held at this range for about 5–10 minutes while gently stirring the mix to give good pasting of the starch and complete gelatinization without overcooking. Caramelization or browning during cooking was avoided as well as excessive or strong agitation. About 12% of the water was evaporated during the cooking operation. The cooked starch paste was then cooled to room temperature and aged overnight for about 12–24 hours.

The egg yolk-oil emulsion was then prepared by pre-mixing the egg yolks, mustard and pepper in a Hobart mixer at low speed (64 r.p.m.) until a smooth mixture was obtained, the speed of the mixer was then increased to high speed (128 r.p.m.) and the cold corn oil was slowly added.

The cooked starch paste and the egg yolk-oil emulsion were then combined by slowly blending the paste into the emulsion at a low Hobart speed (64 r.p.m.). About 3–4 minutes were required to achieve a smooth, uniform emulsion. The final emulsion had a mouth feel, taste and appearance similar to conventional cream-type salad dressing.

The cream-type emulsion was found to contain about 10–12% fat and 20–25 calories per tablespoon of serving compared to about 50–80% fat and 60–110 calories per tablespoon for the conventional cream-type emulsions which employ 45–75% of oil.

The above formulations when tested against normal high calorie salad dressings under accelerated storage test conditions (90° F.), compared favorably relative to stability and did not undergo textural change. The dressings were also stored at refrigerator temperatures of 35°–40° F. over a 3-month period without experiencing syneresis or separation of components.

While this invention has been described by reference to a specific example, it is understood to be limited only by the scope of the appended claims.

What is claimed is:

1. A stable low calorie cream-type salad dressing having the following formulation by weight:

| | Percent |
| --- | --- |
| Water | 50–70 |
| Acidifying ingredient containing 5–15% edible acid | 8–20 |
| Edible vegetable oil | 5–12 |
| Sugar | 5–12 |
| Starch | 3–10 |
| Egg yolk | 3–10 |
| Salt | 0.5–3 |
| Proplyene glycol alginate | 0.1–2 |
| Glycerol | 0.1–2 |
| Flavoring ingredients | 0.1–1 | wherein the starch ingredient is a gelatinized starch containing less than 25% amylose.

2. The salad dressing of claim 1 wherein the gelatinized starch contains no amylose.

References Cited by the Examiner

UNITED STATES PATENTS

| | | | |
| --- | --- | --- | --- |
| 3,067,038 | 12/1962 | O'Connell | 99—144 |
| 3,093,485 | 6/1963 | Partyka | 99—144 |
| 3,093,486 | 6/1963 | Krett et al. | 99—144 |

OTHER REFERENCES

Steiner et al.: "Organic Derivatives of Alginic Acid," Industrial and Engineering Chemistry, September 1951, pp. 2073 to 2077, p. 2076 relied on.

A. LOUIS MONACELL, *Primary Examiner.*

HYMAN LORD, *Examiner.*

J. M. GOLIAN, *Assistant Examiner.*